US009934676B2

(12) United States Patent
Kim

(10) Patent No.: US 9,934,676 B2
(45) Date of Patent: Apr. 3, 2018

(54) APPARATUS FOR DATA PROCESSING

(71) Applicant: LSIS CO., LTD., Gyeonggi-do (KR)

(72) Inventor: Tae-Ho Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/351,907

(22) Filed: Nov. 15, 2016

(65) Prior Publication Data

US 2017/0263109 A1 Sep. 14, 2017

(30) Foreign Application Priority Data

Mar. 9, 2016 (KR) .................... 10-2016-0028091

(51) Int. Cl.
*G08B 29/02* (2006.01)
*G08B 21/18* (2006.01)
(Continued)

(52) U.S. Cl.
CPC ............. *G08B 29/02* (2013.01); *G05B 23/02* (2013.01); *G08B 21/182* (2013.01); *H02J 3/00* (2013.01)

(58) Field of Classification Search
CPC ...... G05B 23/02; G08B 21/182; G08B 29/02; G06F 1/28; G06N 5/02; H04L 41/0853; Y04S 40/166; Y04S 40/168
(Continued)

(56) References Cited

U.S. PATENT DOCUMENTS 8,260,736 B1 * 9/2012 Lear .................... G06N 5/02
706/46
8,451,753 B2 * 5/2013 Vanga ................. H04L 41/0816
370/254
(Continued)

FOREIGN PATENT DOCUMENTS

CN 1905590 A 1/2007
CN 101662382 A 3/2010
(Continued)

OTHER PUBLICATIONS

Korean Office Action dated Aug. 17, 2017 in connection with the counterpart Korean Patent Application.
(Continued)

*Primary Examiner* — Hung T Nguyen
(74) *Attorney, Agent, or Firm* — K&L Gates LLP

(57) ABSTRACT

The present disclosure relates to a data processing apparatus. The data processing apparatus includes: at least one data processor configured to collect the data from the RTUs and check alarm data associated with the collected data; a first data queue generating unit configured to receive the alarm data output from the data processor to create an alarm data queue; an alarm processing unit configured to receive the alarm data included in a first alarm data queue of the first data queue generating unit sequentially to create a second alarm data queue for creating an alarm message, and to create an alarm message based on alarm data in the second alarm data queue to output it. The alarm processing unit includes a second alarm data queue generating unit configured to receive alarm data from the first data queue generating unit and store the received alarm data into a second alarm data queue.

8 Claims, 6 Drawing Sheets

(51) Int. Cl.
*G05B 23/02* (2006.01)
*H02J 3/00* (2006.01)

(58) Field of Classification Search
USPC ............... 340/500, 506, 507, 521, 531, 679; 370/254, 255; 700/9, 286; 706/46
See application file for complete search history.

(56) References Cited

U.S. PATENT DOCUMENTS

| | | | |
|---|---|---|---|
| 9,116,519 | B2 | 8/2015 | Mello |
| 2011/0160923 | A1* | 6/2011 | Vetter ................ G06F 1/28 700/286 |
| 2012/0306620 | A1 | 12/2012 | Karaffa et al. |
| 2013/0177313 | A1 | 7/2013 | Hirth et al. |
| 2015/0123784 | A1 | 5/2015 | Ebel et al. |

FOREIGN PATENT DOCUMENTS

| | | |
|---|---|---|
| JP | 2011065424 A | 3/2011 |
| KR | 1020090050784 A | 5/2010 |
| KR | 100964296 B1 | 6/2010 |
| KR | 100964298 B1 | 6/2010 |
| KR | 10-2013-0079049 A | 7/2013 |
| KR | 10-1323940 B1 | 10/2013 |
| KR | 10-2014-0137991 A | 12/2014 |
| KR | 20150029240 A | 3/2015 |
| KR | 10-2016-0012321 A | 2/2016 |

OTHER PUBLICATIONS

European Search Reports dated Jul. 26, 2017 in connection with the counterpart European Patent Application No. 16193100.1.

* cited by examiner

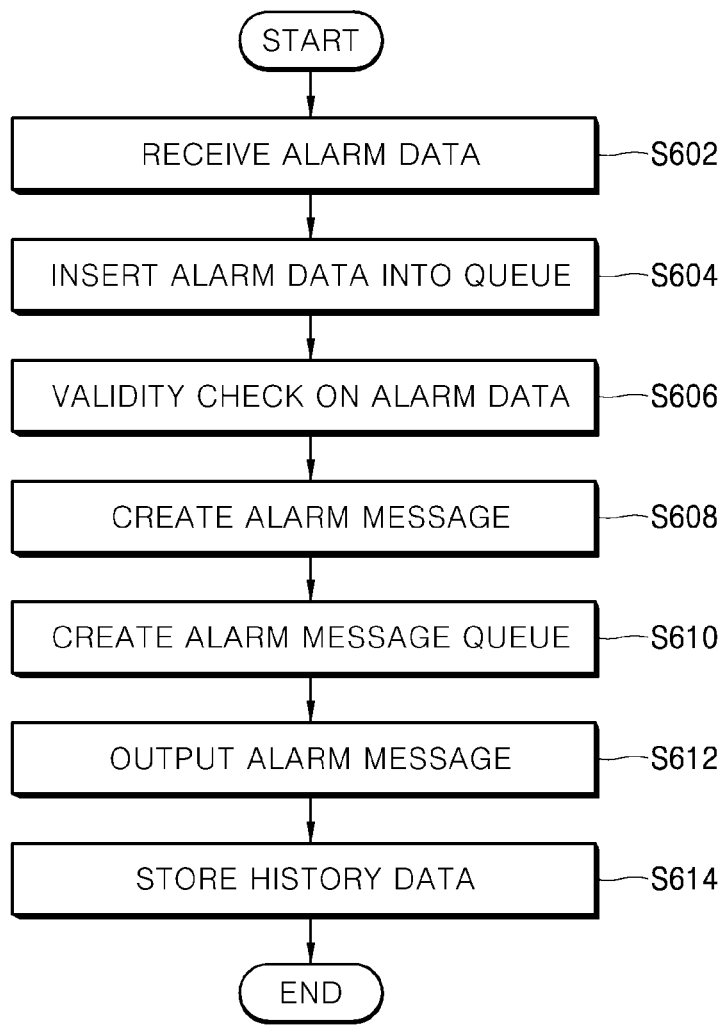

APPARATUS FOR DATA PROCESSING

CROSS REFERENCE TO RELATED APPLICATION

This application claims the benefit of Korean Patent Application No. 10-2016-0028091, filed on Mar. 9, 2016, entitled "APPARATUS FOR DATA PROCESSING", which is hereby incorporated by reference in its entirety into this application.

BACKGROUND

1. Technical Field

The present disclosure relates to a data monitoring apparatus.

2. Description of the Related Art

As the electric power demand increases, power supply systems become more complicated, diversified and has a larger capacity. Sometimes, large-area power outage occurs as a result of failing to quickly detect and cope with a small accident at early stage because accurate data on the power system is not acquired and the performance of the monitoring control system is poor. Accordingly, data acquisition, system analysis and remote monitoring control on overall operating state of a power system in an energy system become more and more important.

In existing systems for managing a power system, data acquisition and data link on a wide range of power systems may be regarded as important operations for stably operating the system. In particular, a system analysis application program may acquire and analyze data from a SCADA (Supervisor Control and Data Acquisition) based on a system analysis database to perform system analysis.

In carrying out such data monitoring, an alarm operation may be carried out for notifying an accident and malfunction based on the acquired data and the state of the system.

FIG. 1 is a flowchart for illustrating operation of processing alarm data in the related art.

Referring to FIG. 1, a data monitoring apparatus may collect data from power systems connected thereto and monitor the collected data (step S11) and may determine whether to create alarm data based on the acquired data. In this example, the alarm data has a sequence number in the order that it is created.

The data monitoring apparatus may determine whether first alarm data has been created (step S12) and may generate a first alarm data item to indicate the first alarm data (step S13).

The data monitoring apparatus may generate and display the first alarm data item and may determine whether a user has checked it (step S14). It may be determined the first alarm data item is checked if the user presses a key to confirm that she/he has checked it. The data monitoring apparatus may still monitor whether second alarm data is created even before the user has not checked yet (step S15). If the second alarm data is created, an item for outputting second alarm data may be created (step S16).

In the existing data monitoring apparatus, it is determined whether the number of accumulated alarm data is above a predetermined number irrespectively of whether the user has checked it (step S17), and alarm data is continuously received and created if the number is not above the predetermined number (step S18).

On the other hand, if the number of accumulated alarm data is above the predetermined number, alarm data may be deleted sequentially irrespectively of whether the user has checked the alarm data (step S19).

That is, in the existing apparatus, even though the user has to recognize and cope with alarm data if the number that alarm is created increases and accordingly alarm data continuously increases, the alarm data is sequentially deleted in the order that it is input as a predetermined time elapses or the number of the alarm data is above a predetermined number. As a result, the user may not recognize the alarm data, resulting in a secondary accident.

In addition, apparatuses outputting the alarm data continuously output alarm data and waits to output unprocessed alarm data until it receives a signal indicating that the alarm data has been processed in the alarm data processor unit. Accordingly, there may be overload of the apparatus, data error on unprocessed operation and the apparatus operation error.

SUMMARY

It is an aspect of the present disclosure to provide a data monitoring apparatus and a processing method that allow data monitoring to be carried out stably.

It is another aspect of the present disclosure to provide a data monitoring apparatus and a processing method that allow a user to easily recognize alarm data indicative of data error and abnormal operation of the apparatus such that secondary accident can be prevented.

A data processing apparatus according to an exemplary embodiment of the present disclosure includes: at least one data processor configured to collect the data from the RTUs and check alarm data associated with the collected data; a first data queue generating unit configured to receive the alarm data output from the data processor to create an alarm data queue; an alarm processing unit configured to receive the alarm data included in a first alarm data queue of the first data queue generating unit sequentially to create a second alarm data queue for creating an alarm message, and to create an alarm message based on alarm data in the second alarm data queue to output it. The alarm processing unit includes a second alarm data queue generating unit configured to receive alarm data from the first data queue generating unit and store the received alarm data into a second alarm data queue.

BRIEF DESCRIPTION OF DRAWINGS

FIG. 6 is a flowchart for illustrating data processing operation of an alarm processing unit according to the exemplary embodiment of the present disclosure.

DETAILED DESCRIPTION

Hereinafter, exemplary embodiments of the present disclosure will be described in detail with reference to the accompanying drawings.

Figure 1:
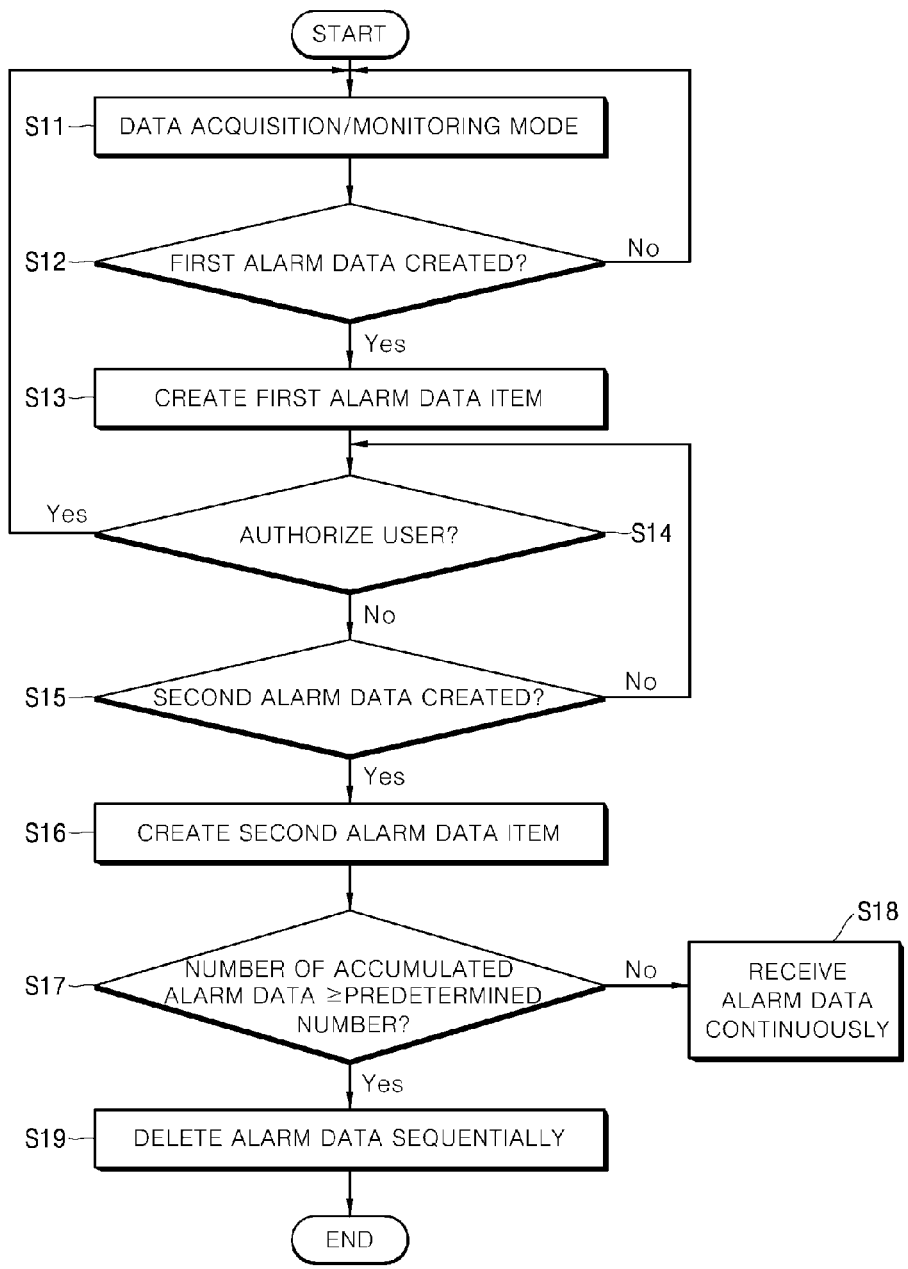
FIG. 1 is a flowchart for illustrating operations of processing alarm data in the related art.
Figure 2:
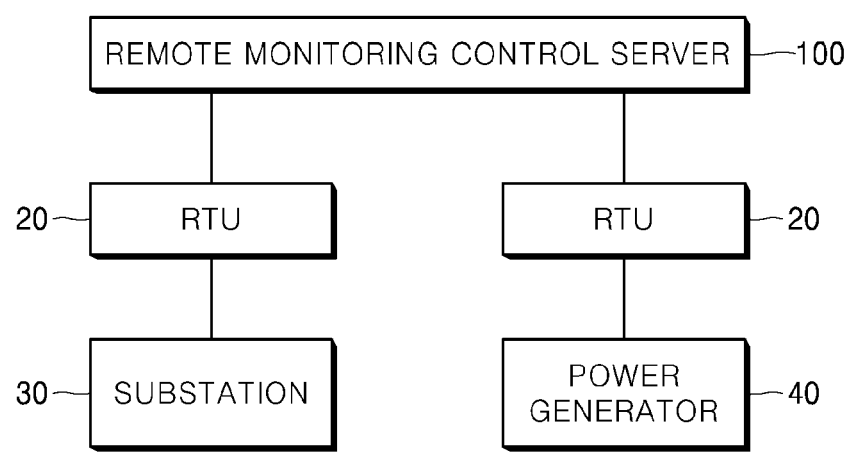
FIG. 2 is a block diagram of a data processing system according to an exemplary embodiment of the present disclosure.

FIG. 2 is a block diagram of a data processing system according to an exemplary embodiment of the present disclosure.

Referring to FIG. 2, examples of the data processing system according to the exemplary embodiment of the present disclosure may be an energy management system or a remote monitoring system. However, examples of the data processing system are not limited thereto but may include a variety of apparatuses for processing data.

In this exemplary embodiment, the data processing system is a remote monitoring system.

The remote monitoring system may include a remote monitoring control server 100 and remote terminal units (RTUs) 20.

The RTUs 20 are field control devices that collect information such as power consumption, reactive power consumption of a substation 30 or a power generator 40, temperature data of a transformer, the state of a circuit breaker from a meter or sensor installed in a remote place and transmits it to the remote monitoring control server 100 via a wired/wireless communications device and communications lines.

In addition, the RTUs 20 may receive a control instruction from the remote monitoring control server 100 and may perform control in real-time and on-line in response to the received control instruction.

The remote monitoring control server 100 monitors/controls one or more RTUs 20 centrally and transmits data collected by the RTUs 20 to the remote monitoring control server 100 via wired/wireless communications lines.

The remote monitoring control server 100 may include a data processor unit and may process and check the data items collected from the RTUs 20. The data items may include data acquired from apparatuses connected to the RTUs 20 and state information data containing states of the apparatuses.

The remote monitoring control server 100 may collect the data items and check the information on the states of the collected data items and the states of the apparatuses to generate alarm data containing information on abnormality of the data or the apparatuses. For example, if the value of collected data is continuously the same depending on the type of data or the output range of the data is out of the threshold range, the data may be determined as error data and alarm data for the data may be created. In addition, the remote monitoring control server 100 according to the exemplary embodiment of the present disclosure may include an alarm processing unit for generating alarm data and processing the alarm data. The above-described configuration and a series of operations will be described in detail with reference to FIG. 3.

Figure 3:
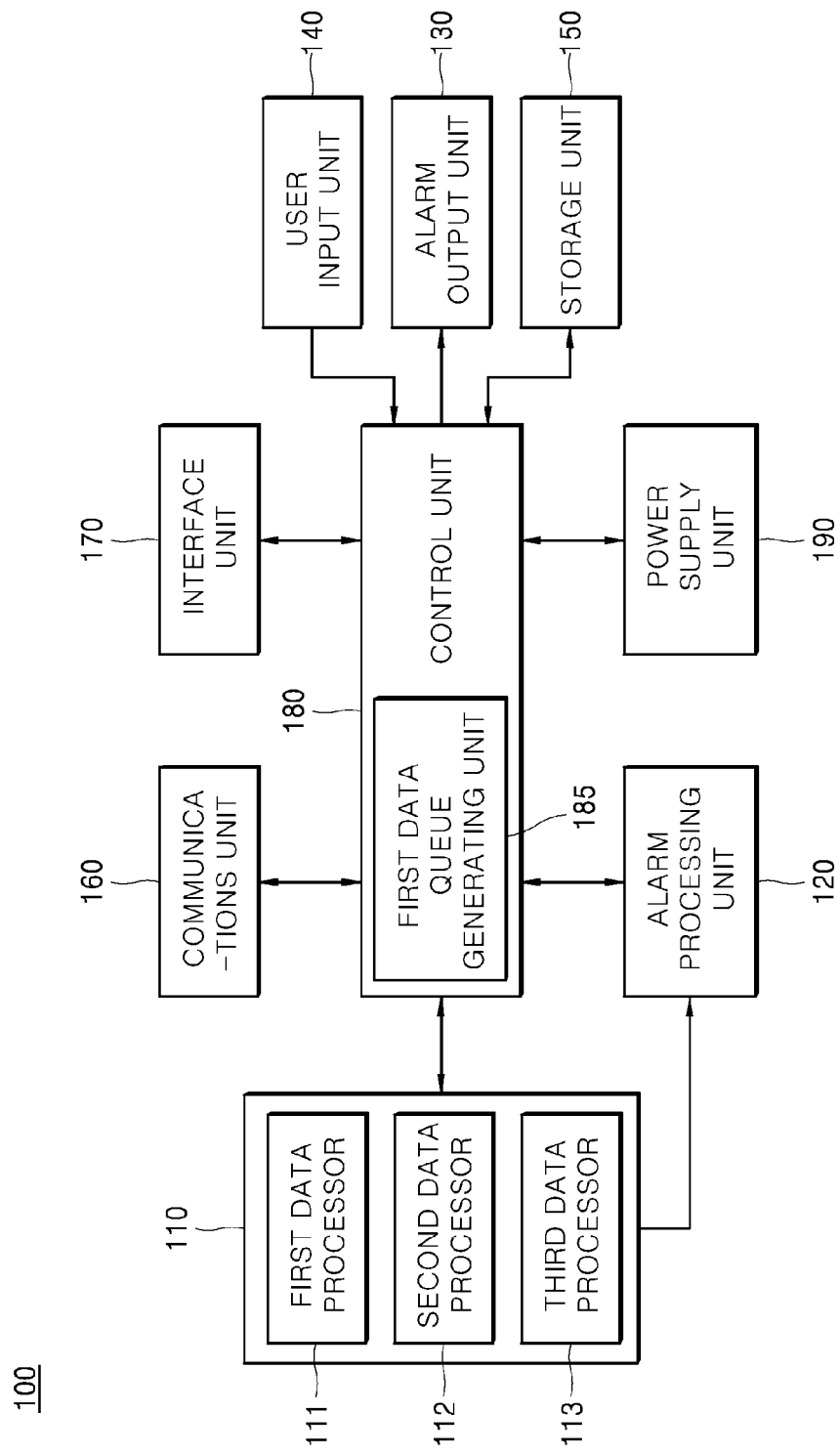
FIG. 3 is a block diagram of the remote monitoring control server in a data processing system according to the exemplary embodiment of the present disclosure.

FIG. 3 is a block diagram of the remote monitoring control server in a data processing system according to the exemplary embodiment of the present disclosure.

Referring to FIG. 3, the remote monitoring control server 100 according to the embodiment of the present disclosure may include a data processor unit 110, an alarm processing unit 120, an alarm output unit 130, a user input unit 140, a storage unit 150, a communications unit 160, an interface unit 170, a control unit 180, and a power supply unit 190.

The data processor unit 110 may process and check the data collected from the RTUs 20. The data processor unit may include a plurality of data processors depending on the RTUs 20 or data to be processed. In this exemplary embodiment, the data processor unit 110 includes first to third data processors 111 to 113. However, in some embodiments of the present disclosure, the data processor unit may include one or more data processors.

The data processor unit 110 may check the data collected from the RTUs 20 and may create alarm data containing information on abnormality of data or an apparatus. The alarm data may be created in each of the data processors.

In addition, the alarm data generated in each of the data processors may generate an alarm data queue for each of the data processors and may insert the generated alarm data into the alarm data queue sequentially. Alternatively, the control unit 180 may create an alarm data queue such that the alarm data created in each of the data processors may be collected and stored in the alarm data queue. In this exemplary embodiment, alarm data generated in each of the data processors 111, 112 and 113 is collected in an alarm data queue (hereinafter referred to as to a first alarm data queue).

Each of the data processors 111, 112 and 113 may insert the generated alarm data into the alarm data queue and return to a data acquisition and process mode upon receiving a signal indicating that the data has been inserted, such that the alarm data generation event operation is completed.

The alarm processing unit 120 may read and check the data that is generated in the data processor unit 110 to be stored in the alarm data queue and may create and output an alarm message for the checked alarm data items. The alarm processing unit 120 may include a second alarm data queue in which alarm data received from the first data queue generating unit 185 is accumulated and stored. In addition, the alarm processing unit 120 may read out the alarm data stored in the second alarm data queue to create an alarm message to be checked and output to a client. The configuration and operation of the alarm processing unit 120 will be described in detail later with reference to FIG. 4.

The alarm output unit 130 may output an alarm message corresponding to the alarm data processed in the alarm processing unit 120. The alarm output unit 130 may be included in an output unit generating audible or visible output for outputting operating state and data in a remote monitoring control server, or may be disposed as a separate element.

The alarm output unit 130 may include a display unit or an audio output unit for outputting an alarm message corresponding to the alarm data processed in the alarm processing unit 120.

The user input unit 140 receives input data from a user to control the operation of the server 100. The user input unit 140 may include a keypad, a dome switch, a touch pad, a jog wheel, a jog switch, etc.

The storage unit 150 may store a program for operation of the server 100 therein and may temporally store input/output data therein. The storage unit 150 may store alarm data processed in the alarm processing unit 120 or an alarm message corresponding to the alarm data.

The communications unit 160 may be connected to the RTUs 20 connected to the server 100 or may include at least one module that allows for communications with a terminal device for receiving alarm data. For example, the communications unit 160 may include at least one of a wireless communications module, a local area communications module and a wired communications module depending on devices connected thereto.

The interface unit 170 may work as a path to external devices connected to the server 100. The interface unit 170 may receive data or power from an external device and may transmit it to each of the elements in the server 100. In addition, the interface unit 170 may allow data in the server 100 to be transmitted to an external device. The interface unit 170 may be included in the communications unit 160.

Normally, the control unit 180 controls the overall operation of the server 100. The control unit 180 may include a first data queue generating unit 185 that receives alarm data output from the data processor unit 110 to generate an alarm data queue according to the exemplary embodiment of the present disclosure.

The first spooler 185 may receive alarm data output from each of the data processors 110 sequentially, make a list of them, and generate an alarm data queue. The alarm data items in the alarm data queue generated in the first data queue generating unit 185 may be output to the alarm processing unit 120 and may be used to carry out operation for outputting an alarm message in a second alarm data queue generating unit 121 of the alarm processing unit 120.

According to another exemplary embodiment of the present disclosure, a plurality of first data queue generating units may be disposed, each corresponding to the respective data processor units 110, or the first data queue generating unit 185 may be a single module that collects alarm data output from each of the data processor units 110.

The power supply unit 190 receives power externally or internally under the control of the control unit 180 and may supply power required for operating the elements.

Figure 4:
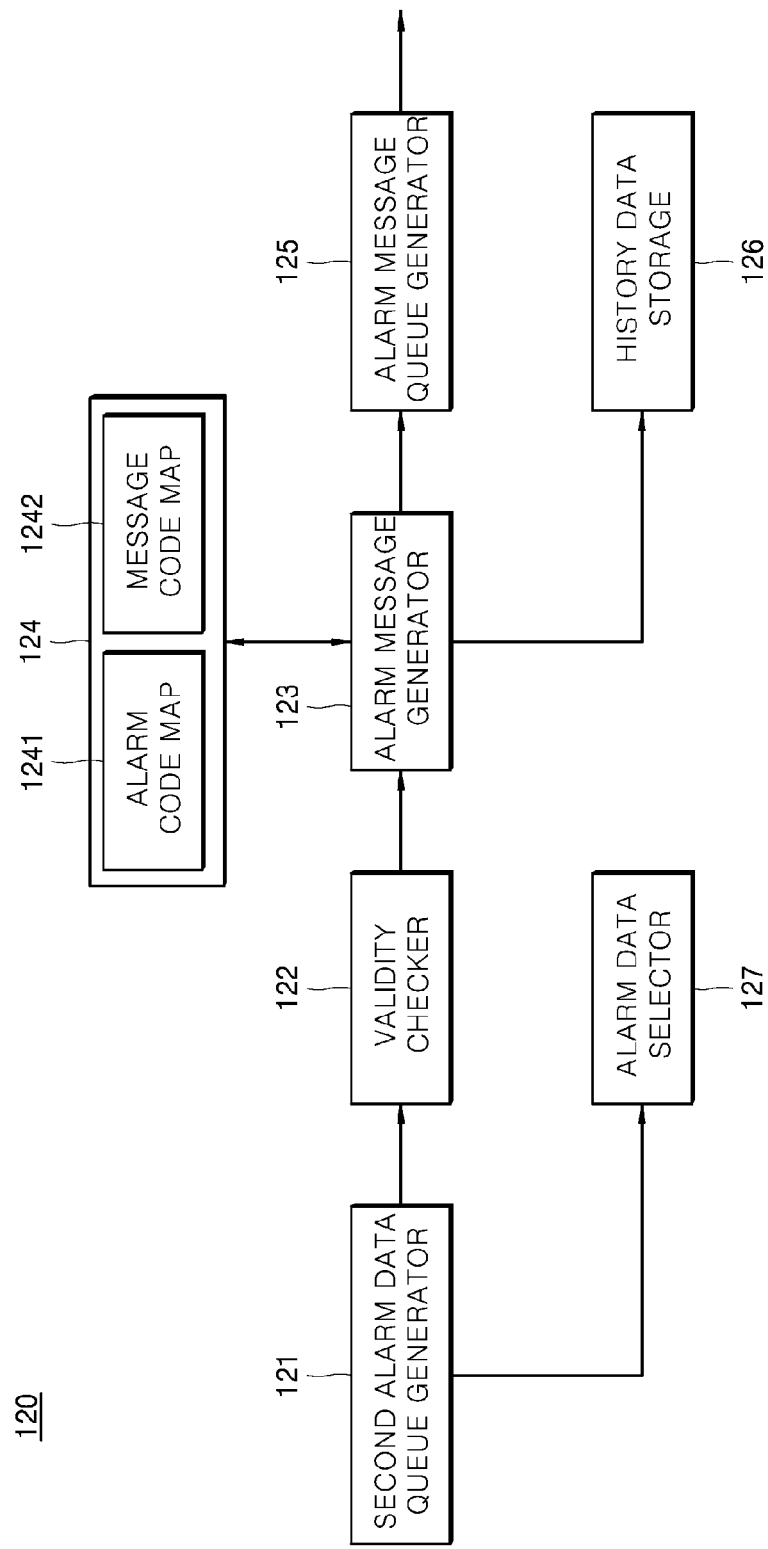
FIG. 4 is a block diagram of an alarm processing unit of a remote monitoring control server according to an exemplary embodiment of the present disclosure.

FIG. 4 is a block diagram of an alarm processing unit of a remote monitoring control server according to an exemplary embodiment of the present disclosure.

Referring to FIG. 4, the alarm processing unit 120 according to the exemplary embodiment may include a second alarm data queue generating unit 121, a validity checker 122, an alarm message generator 123, a code map 124, an alarm message queue generator 125, history data storage 126 and an alarm data selector 127.

The second alarm data queue generating unit 121 may receive alarm data input to the first data queue generating unit 185 via the data processor unit 110 sequentially and store it to generate an alarm data queue. The second alarm data queue generating unit 121 may receive and store the alarm data in the order that it is input from the alarm data queue stored in the first data queue generating unit 185 or based on the importance. The importance of the alarm data may be the priority of alarm data, which may be determined based on the user setting or device characteristics.

In addition, the second alarm data queue generating unit 121 may output the alarm data in the order that it is stored and may generate an alarm message to output it.

The second alarm data queue generating unit 121 may be configured as a single module, irrespectively of the configuration of the first data queue generating unit 121.

The validity checker 122 may carry out validity check on alarm data when the alarm data to be processed as an alarm message is read from the alarm data queue created in the second alarm data queue generating unit 121. The validity check may be carried out to determine whether the alarm data is normal data or whether an accident or error event corresponding to the alarm data has been treated. If the accident or error event has been treated, the alarm message may not be created. Accordingly, the data may be processed as invalid data. In addition, it may be determined whether alarm data is normal or not based on information of an apparatus that has created the alarm data or on processing history information. Other kinds of validity check may also be carried out depending on execution conditions.

The alarm message generator 123 may perform the function of generating an alarm message for alarm data processed as valid alarm data in the validity checker 122. In this exemplary embodiment of the present disclosure, the alarm data is registered as a code of alarm data, not as an alarm message. Specifically, the alarm data may be registered as an alarm data code indicative of alarm data. An alarm message may be created by matching the alarm data code with a corresponding alarm message. Accordingly, the alarm message generator 123 may match an alarm data code with an alarm message corresponding to the alarm data code and create an alarm message displayed on a screen.

To create an alarm message corresponding to the alarm data code, the alarm message generator 123 may utilize data of the code map 124.

The code map 124 may include an alarm code map 1241 and a message code map 1242.

The alarm code map 1241 may identify an alarm code of the alarm data by referring to alarm data output from the alarm data queue generated in the second alarm data queue generating unit 121 and may acquire alarm information corresponding to the alarm code. That is, the alarm code map 1241 may include specific information on which alarm data the alarm data code defines from the alarm data code.

The message code map 1242 may include alarm message generation information for generating the alarm data as an alarm message to be displayed on the screen based on the information on the alarm data checked in the alarm code map 1241. Specifically, the message code map 1242 may store a text or image data therein for matching the alarm data with an alarm message in the form of a sentence or an image. Accordingly, data for creating an alarm message displayed on the screen may be provided by matching a text or an image corresponding to the checked alarm data.

The alarm message queue generator 125 may receive the alarm message created in the alarm message generator 123 in the order that it is created or it is output and may create a list of alarm messages. The alarm messages in the list created in the alarm message queue generator 125 may be output to the alarm output unit 130 or a remote terminal device based on a predetermined criteria. In addition, the list of alarm messages created in the alarm message queue generator 125 may be created as a real-time alarm queue or an even queue depending on the type of an alarm message or alarm data. Specifically, an alarm message queue may be divided into a real-time alarm queue to be output to the even output unit 130 or a remote terminal device in real-time and an event queue outputting the alarm message at a particular time point (at a time point at which an event takes place) depending on the type and state of the alarm message or alarm data for generating the alarm message.

The history data storage 126 may store information on history of processing alarm data or history of creating and processing alarm message therein. The history data storage 126 may identify information processed and operated in the alarm processing unit 120 and may store and manage it as history data.

The alarm data selector 127 may carry out operations for inputting and outputting alarm data requested externally. Specifically, the alarm data selector 127 may receive an input request signal for alarm data checked via the user input unit 140 or the interface unit 170 and may output the input request signal to the second alarm data queue generating unit 121 to create and output an alarm message for the alarm data.

The data processing operation of the server 100 and the alarm processing unit 120 having the above-described configuration will be described in detail with reference to FIGS. 5 and 6.

Figure 5:
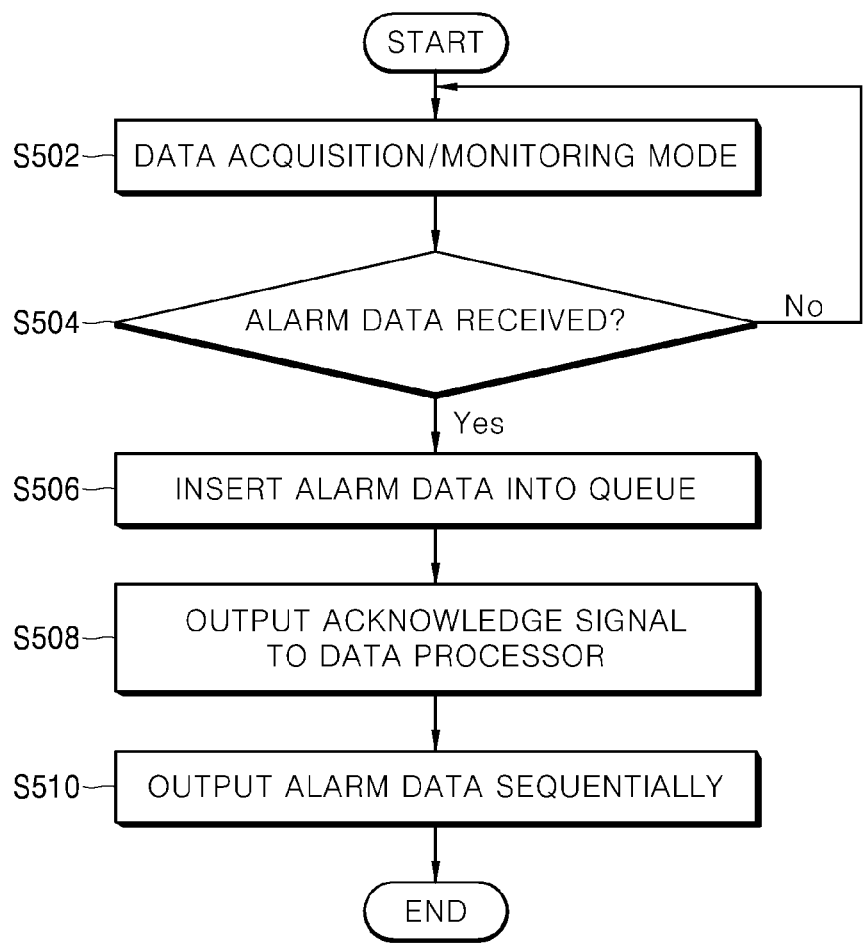
FIG. 5 is a flowchart for illustrating data processing operation of a data processor unit of a remote monitoring control server according to the exemplary embodiment of the present disclosure.

FIG. 5 is a flowchart for illustrating data processing operation of a data processor unit of a remote monitoring control server according to the exemplary embodiment of the present disclosure.

Referring to FIG. 5, the data processor unit 110 of the server 100 may receive data from the RTUs 20 and process them (step S502). The data processor unit 110 may include one or more data processors, each corresponding to the respective devices connected thereto.

The control unit 180 may determine whether alarm data is received while the data processor unit 110 is in a data acquisition and monitor mode (step S504). The alarm data may be received directly from devices connected to the data processor unit 110, or if data received in the data processor unit may be processed and detected as alarm data if the data meets a predetermined criterion to be determined as alarm data.

If alarm data is detected, the control unit 180 may output the alarm data to the first data queue generating unit 185 from the data processor unit 110 that has detected the alarm data. That is, the control unit 180 may insert the detected alarm data into an alarm data queue of the first data queue generating unit 185 to create a list of alarm data (step S506).

As described above, the first data queue generating unit 185 may be included in each of the data processor units 110 or may be configured as a single module.

When the alarm data is inserted into the alarm data queue of the first data queue generating unit 185, the control unit 180 may output an acknowledge signal ACK to notify the data processor unit that the alarm data has been inserted into the queue (step S508). Accordingly, the data processor unit may return to process the next task after outputting the alarm data, such that processing load on alarm data can be reduced.

The control unit 180 may output alarm data items inserted into the alarm data queue of the first data queue generating unit 185 according to a variety of criteria such as the order that they are input or processed (step S510). That is, the control unit 180 may store alarm data received from each of the data processors of the data processor unit 110 in the queue sequentially and may output it to the alarm processing unit 120 based on the order that it is output in order to create an alarm message.

Hereinafter, an operation for creating an alarm message with alarm data output to the alarm processing unit 120 will be described in detail.

FIG. 6 is a flowchart for illustrating data processing operation of an alarm processing unit according to the exemplary embodiment of the present disclosure.

Referring to FIG. 6, the alarm processing unit 120 may receive alarm data from the first data queue generating unit 185 (step S602). The alarm data may be an alarm data code.

In the alarm processing unit 120, the alarm data received from the first data queue generating unit 185 may be input to the second alarm data queue generating unit 121 for creating an alarm data queue. The second alarm data queue generating unit 121 may store the alarm data in the order that it is input or it is processed to create a list of alarm data (step S604).

The alarm processing unit 120 may output the alarm data created as the list in the second alarm data queue generating unit 121 sequentially for creating an alarm message. The validity checker 122 of the alarm processing unit 120 may conduct validity check on the alarm data output sequentially (step S606).

In the validity checker 122, it may be determined whether the output alarm data is valid or not. Through the validity check, it may be determined whether the alarm data is normal data or whether an accident or error event corresponding to the alarm data has been treated. If the accident or error event has been treated, the alarm message may not be created. In addition, it may be determined whether alarm data is normal or not based on information of an apparatus that has created the alarm data or on processing history information. Other kinds of validity check may also be carried out depending on execution conditions.

If the alarm data is determined as being valid, the alarm message generator 123 may create an alarm message for the alarm data by referring to the code map 124 (step S608).

The alarm message generator 123 may create an alarm message for the alarm data that was output from the alarm data queue of the second alarm data queue generating unit 121 and has been determined as being valid such that the alarm message is output on the screen or on a remote terminal device as the alarm message.

The alarm message may be created by identifying an alarm code included in alarm data, and referring to an alarm message code map that may be output as an alarm message such as a text or an image based on information of the alarm data corresponding to the alarm code and the checked alarm data information.

The alarm message queue generator 125 of the alarm processing unit 120 may create a list of alarm messages that were created in the alarm message generator 123 in the order that they are output or created (step S610).

The alarm message queue generator 125 may output alarm messages via the alarm output unit 130 in the order that they are created as an alarm message in an alarm message queue or may transmit them to a destination such as a predetermined terminal device to be output (step S612).

The history data storage 126 of the alarm processing unit 120 may store a series of operation information on the alarm message generation and output (step S614).

As set forth above, according to an exemplary embodiment of the present disclosure, a user can recognize error of acquired data and abnormality of the apparatus from alarm data continuously provided, such that the load of the apparatus is reduced. Accordingly, data can be processed stably and secondary accident can be prevented.

What is claimed is:

1. A data monitoring apparatus comprising:
at least one data processor configured to collect data from a plurality of remote terminal units (RTUs) and check alarm data associated with the collected data;
a first data queue generating unit configured to receive the alarm data output from the data processor to create an alarm data queue;
an alarm processing unit configured to receive the alarm data included in a first alarm data queue of the first data queue generating unit sequentially to create a second alarm data queue for creating an alarm message, and to create an alarm message based on alarm data in the second alarm data queue to output it,
wherein the alarm processing unit comprises a second alarm data queue generating unit configured to receive alarm data from the first data queue generating unit and store the received alarm data into a second alarm data queue.

2. The apparatus of claim 1, wherein the first data queue generating unit is configured to create at least one alarm data queue corresponding to the alarm data output from the data processor.

3. The apparatus of claim 1, wherein the second alarm data queue generating unit is configured to store alarm data input from the first alarm data queue of the first data queue generating unit er in the order that it is input or it is processed.

4. The apparatus of claim 1, wherein the alarm processing unit comprises
- a validity checker configured to carry out validity check on alarm data stored in the second alarm data queue of the second alarm data queue generating unit; and
- a message generator configured to create the alarm data as an alarm message if the alarm data has been determined as being valid.

5. The apparatus of claim 4, wherein the alarm data comprises an alarm code, wherein the message generator creates an alarm message based on the alarm code.

6. The apparatus of claim 5, wherein the alarm processing unit comprises
- an alarm code map configured to store alarm data information on an alarm code of alarm data; and
- a code map including a message code map that stores alarm message generation information on the alarm data.

7. The apparatus of claim 4, wherein the alarm processing unit further comprises an alarm message queue generator configured to store the alarm message created in the alarm message generator in an order that it is output.

8. The apparatus of claim 1, wherein the data processor returns to a previous mode before the alarm data is output upon receiving a response signal from the first data queue generating unit after the alarm data is output.

\* \* \* \* \*